(12) United States Patent
Sondey

(10) Patent No.: US 6,591,665 B2
(45) Date of Patent: *Jul. 15, 2003

(54) MODULAR ENGINE DELIVERY APPARATUS

(76) Inventor: Thomas F. Sondey, 9068 Lone Pine, Shelby Township, MI (US) 48317

( * ) Notice: Subject to any disclaimer, the term of this patent is extended or adjusted under 35 U.S.C. 154(b) by 0 days.

This patent is subject to a terminal disclaimer.

(21) Appl. No.: 09/897,185

(22) Filed: Jul. 2, 2001

(65) Prior Publication Data

US 2001/0039832 A1 Nov. 15, 2001

Related U.S. Application Data

(63) Continuation of application No. 09/283,515, filed on Apr. 1, 1999, now Pat. No. 6,253,600.

(51) Int. Cl.⁷ .............................................. G01M 15/00
(52) U.S. Cl. ............................... 73/116; 269/17; 269/20
(58) Field of Search ............................... 73/116, 117.2, 73/117.3, 118.1, 119 R; 269/16, 17, 20, 56

(56) References Cited

U.S. PATENT DOCUMENTS

| | | |
|---|---|---|
| 2,669,870 A | 2/1954 | Bennett |
| 2,991,649 A | 7/1961 | Kinsey |
| 3,075,381 A | 1/1963 | Lelis |
| 3,675,914 A | 7/1972 | Douglass |
| 3,798,964 A | 3/1974 | Misseroni |
| 3,834,221 A | 9/1974 | Swis et al. |
| 3,942,363 A | 3/1976 | Swis et al. |
| 4,174,627 A | 11/1979 | Swis et al. |
| 4,285,233 A | 8/1981 | Swis |
| 4,431,103 A | 2/1984 | Sekii |
| 4,732,036 A | 3/1988 | Weeder |
| 4,846,451 A | 7/1989 | Squier |
| 4,928,806 A | 5/1990 | Anderson et al. |
| 4,941,347 A | 7/1990 | Iijima et al. |
| 5,301,788 A | 4/1994 | Hironaka et al. |
| 5,509,301 A | 4/1996 | Takano et al. |
| 5,600,059 A | 2/1997 | Sondey |
| 5,629,476 A | 5/1997 | Sondey |
| 5,851,007 A | 12/1998 | Swartzlander et al. |

Primary Examiner—Eric S. McCall
(74) Attorney, Agent, or Firm—Harness, Dickey & Pierce, P.L.C.

(57) ABSTRACT

An apparatus for delivering an engine to a dynamometer is provided with an exhaust system, coolant system, electrical system, and an engine mounting system. The systems decrease the time required to dress an engine while increasing test reliability and the number of engines that can be tested in an engine test room.

20 Claims, 4 Drawing Sheets

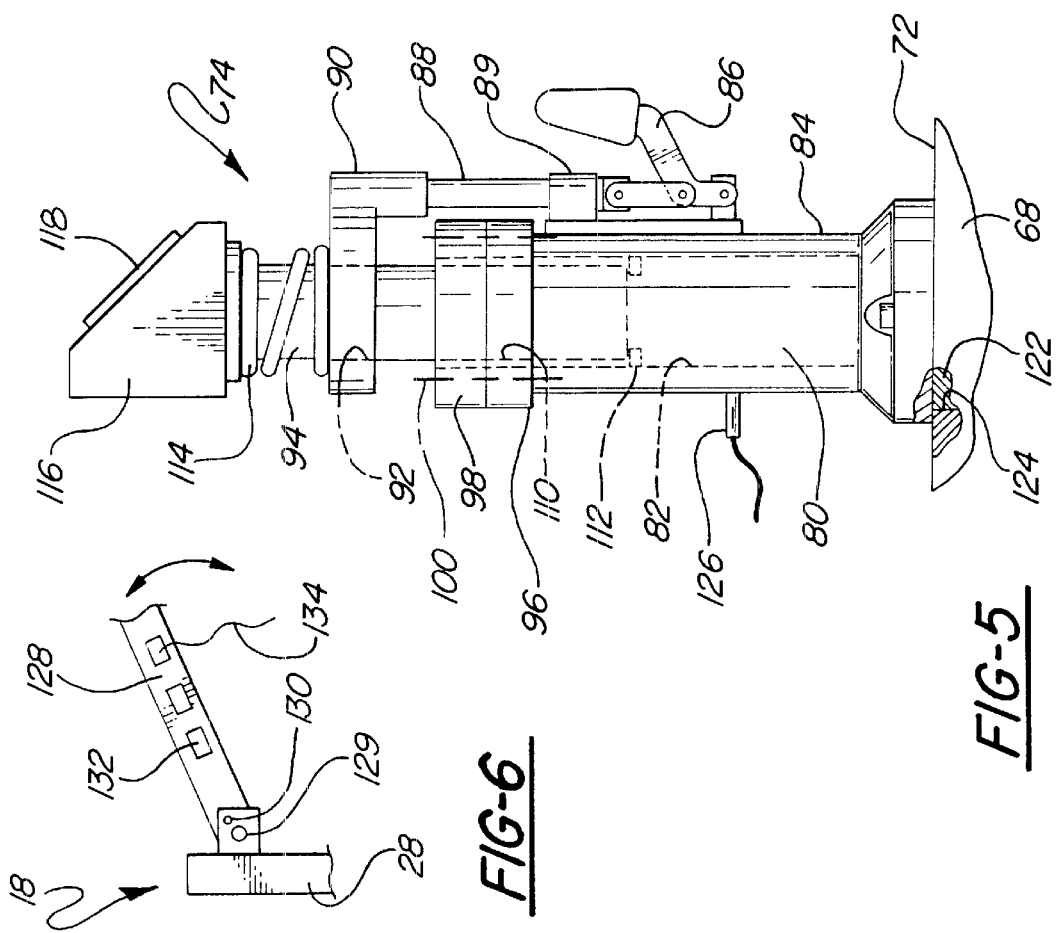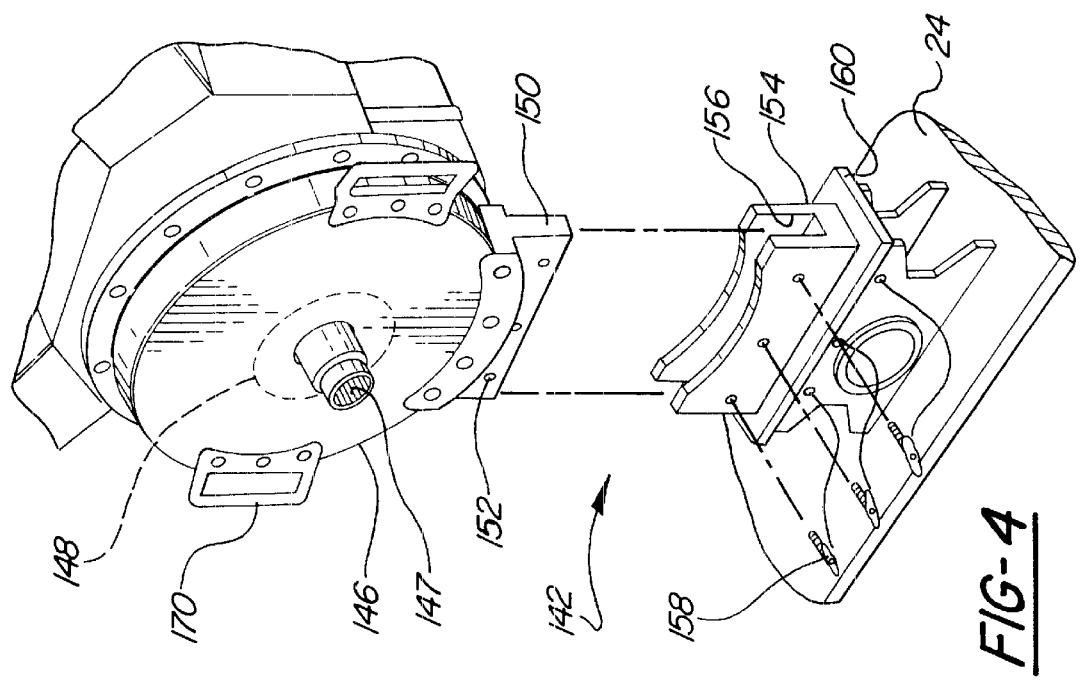

MODULAR ENGINE DELIVERY APPARATUS

CROSS-REFERENCE TO RELATED APPLICATIONS

This application is a continuation of U.S. patent application Ser. No. 09/283,515 filed on Apr. 1, 1999, now U.S. Pat. No. 6,253,600 the disclosure of which is incorporated herein by reference.

FIELD OF THE INVENTION

This invention relates in general to an engine testing device, more specifically, to an improved portable engine testing apparatus having integral fluid, exhaust and electrical systems.

BACKGROUND AND SUMMARY OF THE INVENTION

Engine delivery systems are used to facilitate testing of an engine in an engine dynamometer room. In order to maximize usage of the dynamometer room, it has been desirable to increase the number of engines that can be tested during each shift of operation of the manufacturing facility. When maximizing the number of engines that can be tested during each shift, it is also necessary to maintain reliability of each test. Standardizing the testing process through improved test fixtures is an aspect of improving reliability of the test results.

Conventional engine delivery systems employ a wheeled pallet system that allows an operator to dress the engine in a holding area and then hook up the fluid lines to a vertically arranged fluid manifold. The pallet is then moved to the dynamometer room where the exhaust pipes are connected to the engine exhaust manifold and the electrical system is connected to the engine. The engine is then ready to be tested.

It has become desirable to improve the engine delivery system by integrating both a coolant system and an exhaust system with the wheeled pallet assembly. It is further desirable to centerize the electrical connectors and an electrical panel in order to streamline the electrical system on the pallet assembly. Also, it is desirable to provide an improved engine mounting system that allows an engine to be easily and quickly secured to the engine pallet. The aforementioned components should improve reliability of the test data by consistently delivering an engine to a dynamometer which in turn, will test the engine's performance. Such a system should also minimize the number of connections that need to be made in the dynamometer room in order to minimize the test cycle time and set up the engine prior to starting the test. The improved system should also increase the number of engines that can be tested each shift.

According to one aspect of the present invention, an engine delivery system is comprised of a metal frame having a base and an upwardly extending member. Connected to the base is an engine coolant system for delivering fluid to and from the engine, and an exhaust recovery system that includes an adjustable member for engaging the exhaust manifold of the engine. An engine support system secures the engine to be tested to the base. An electrical system includes a pivoting overhead boom that provides a central collecting point for the wires that are connected to a plurality of sensors.

These and other aspects, objects and advantages of the present invention will be further understood by examining the preferred embodiments of the present invention illustrated in the drawings and by studying the detailed description and the claims found below.

BRIEF DESCRIPTION OF THE DRAWINGS

FIG. 4 is a partial perspective view illustrating the bell housing disconnected from the cradle;

FIG. 5 is a side elevational view of the adjustable exhaust connector that transfers exhausts from the engine exhaust manifold to the exhaust collection cavity; and FIG. 6 is a partial side elevational view illustrating the boom in a raised position.

DETAILED DESCRIPTION OF THE PREFERRED EMBODIMENTS

Figure 1:
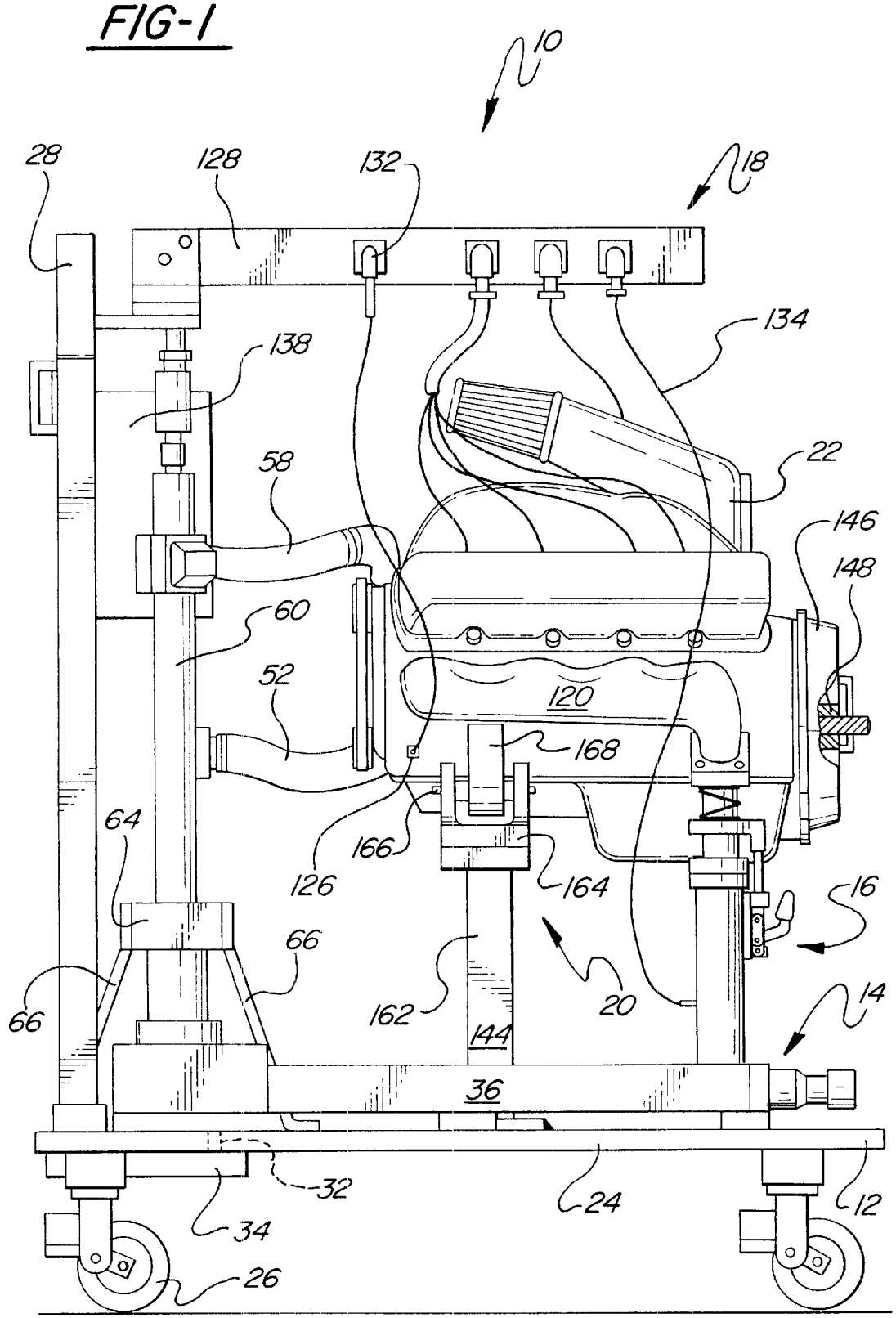
FIG. 1 is a side elevational view of the present invention, showing an engine mounted to a pallet, the exhaust assembly, the coolant system and the electrical system.
Figure 2:
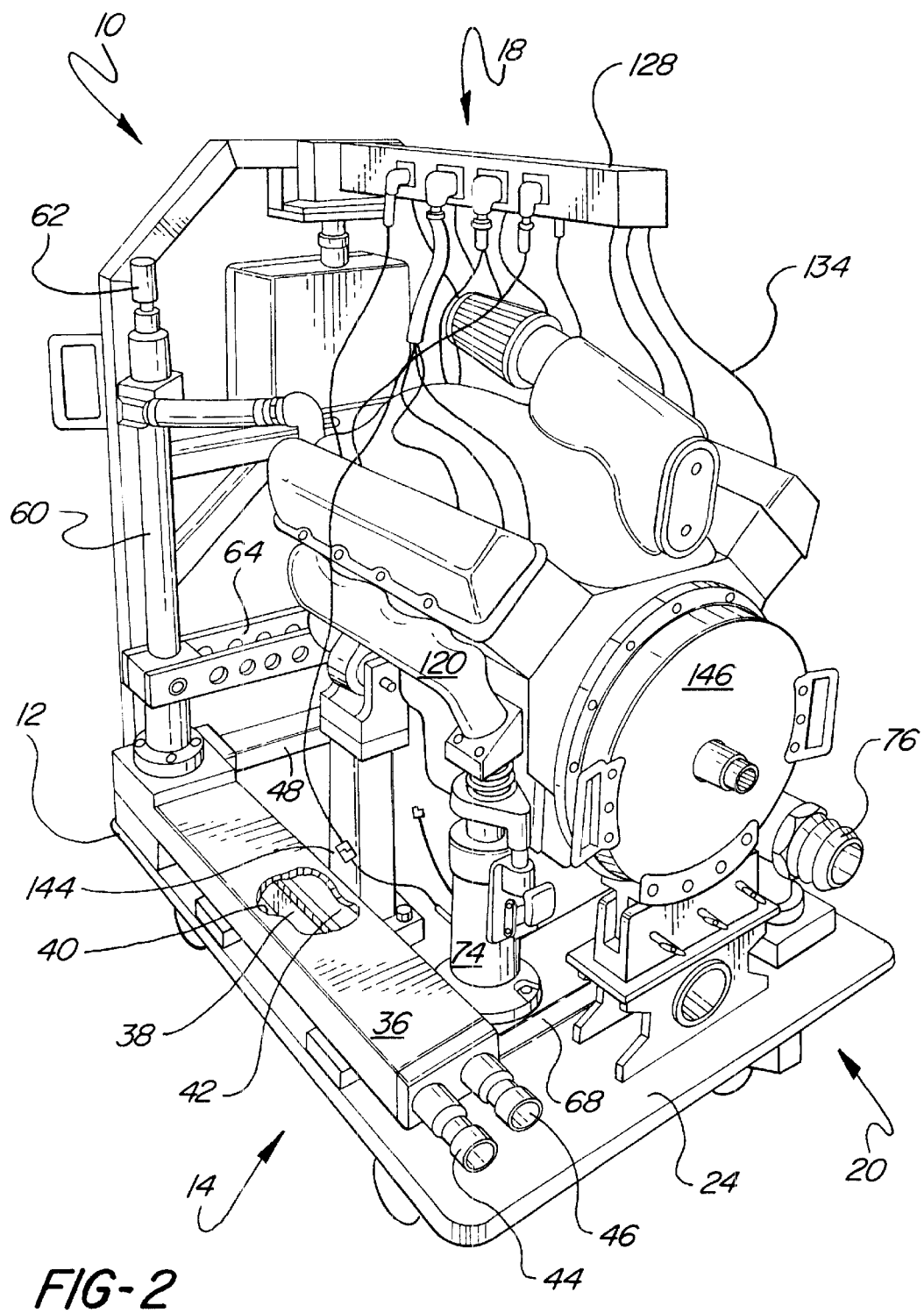
FIG. 2 is a perspective view of the left side of the engine delivery system, illustrating the front engine mount, the exhaust system and a cut out of the manifold showing the inlet and outlet flow chambers.
Figure 3:
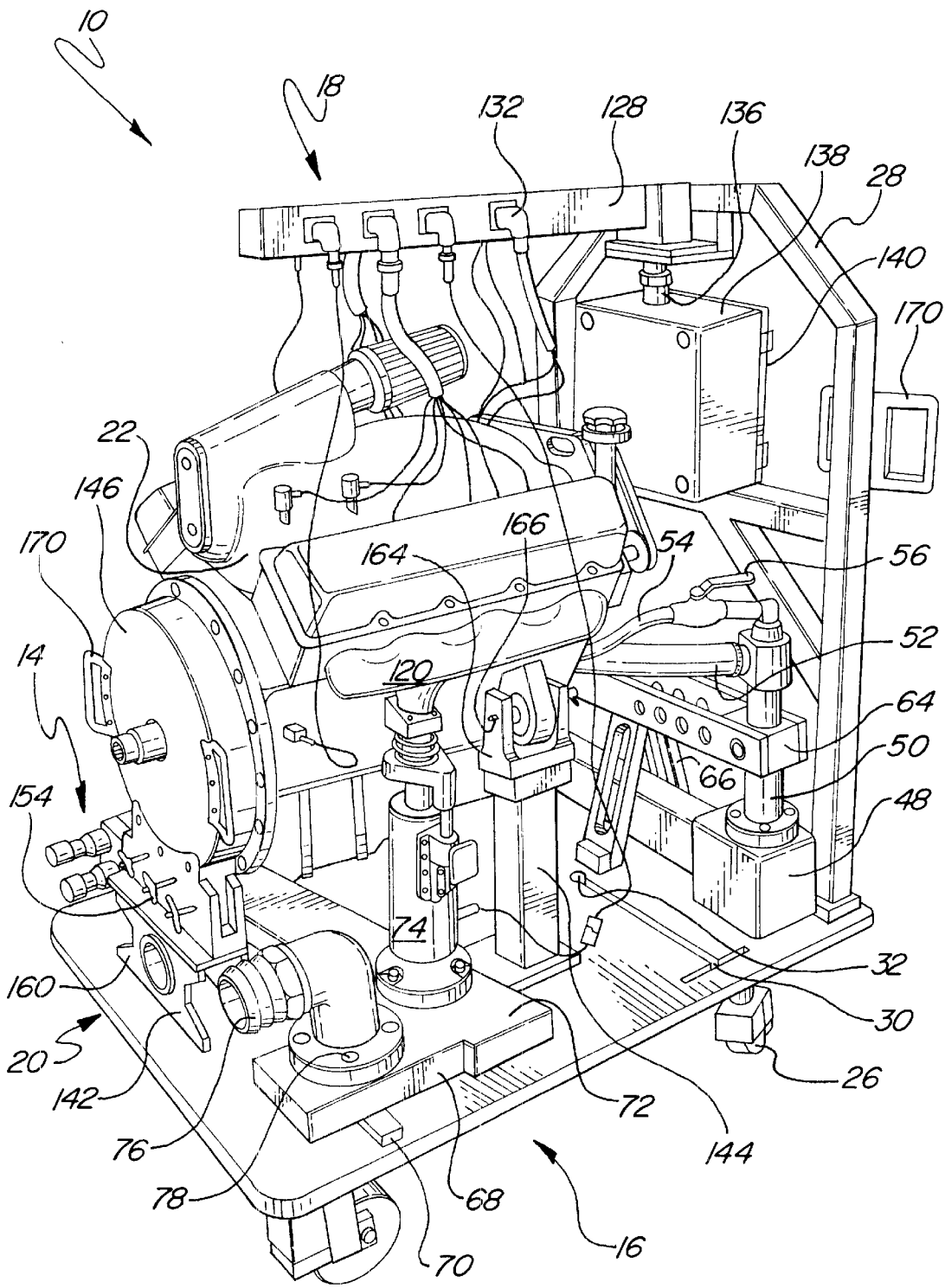
FIG. 3 is a perspective view of the right side of the engine delivery system, illustrating the exhaust system, the electrical system and the engine mounting system.

With reference to FIGS. 1 through 3, an engine delivery system 10 is comprised of a pallet 12, a coolant system 14, an exhaust system 16, an electrical system 18, an engine mounting system 20, and an engine 22. The pallet 12 includes a machined steel base plate 24 with wheel assemblies 26 secured to the underside of the base plate, and a vertically extending frame member 28. A recess 30 is machined in the base plate 24 and delivers spilled fluid to a drain hole 32. A removable pan 34 is connected to the underside of the base plate and is located underneath the drain hole 32 for collecting fluids.

The coolant system 14 provides engine coolant to the engine water jacket and removes the heated coolant from the engine and off of the pallet 12. The coolant system 14 includes a fluid manifold 36 made of corrosion resistant material and has an internal partition 38 which internally separates a first chamber 40 from a second chamber 42. The first chamber is connected to the outlet connector 44 and the second chamber is connected to the inlet connector 46. The connectors preferably are of quick-disconnect type style to allow an operator to easily connect the coolant system 14 to the corresponding coolant system within the dynamometer room. A pipe 48 is connected to the second chamber which in turn is connected at one end to an upwardly extending pipe 50. The pipes are preferably made of corrosion resistant tube steel. Hose 52 supplies coolant to the engine block and hose 54 together with control valve 56 act as an override if the thermostat fails.

Coolant is removed from the engine block through outlet hose 58 to return pipe or column 60 which in turn is in fluid connection with first chamber 40. A pressure safety valve 62 is located at a distal end of the return pipe 60.

A support member 64 extends between pipes 50 and 60 and has a pair of braces 66 extending downward therefrom which are fixed to the base plate 24.

The exhaust system 16 includes an exhaust collection cavity 68 that is spaced apart from the base plate 12 by spacers 70 in order to increase heat dissipation from the collection cavity. The collection cavity is a closed member that is preferably made of steel with three holes 124 extending through the top surface 72 for receiving a pair of adjustable exhaust connectors 74 and an exhaust outlet 76. The exhaust outlet 76 is preferably of a quick-disconnect type in order to allow an operator to easily connect an exhaust line which extends to a scrubber. The exhaust connectors 74 and exhaust outlets 76 are secured via suitable fasteners 78 to the top surface 72.

With reference to FIG. 5, the adjustable exhaust connector 74 includes a column 80 that is preferably made of stainless steel that has an internal bore 82 machined therein. The outside surface of the column 80 has a flat 84 that is operable to receive a clamp 86 having a rod 88 extending through a guide 89. Connected to an upper end of the rod 88 is an upper clamp member 90 with a bore 92 that is operable to receive a corrosion resistant rigid hollow sleeve 94. A shoulder 96 is fixed to the upper end of the column 80 and a retainer plate 98 is secured by fasteners 100 to the shoulder 96. The retainer plate 98 has a reduced internal diameter 110. Retainer members 112, such as screws, are located in the bottom of the sleeve 94 to act as a stop against the underside of retainer plate 98 so that the sleeve 94 does not separate from column 80. A spring 114 is disposed between the upper clamp member 90 and a head 116 which includes an articulating coupling 118. The coupling 118 pivots in order to provide alignment to the centerline of the engine's exhaust manifold. Further, once the spring 114 is loaded by clamp 86, a constant force biases the coupling 118 against the exhaust manifold 120 to create a seal.

The lower end of the column 80 has a lip 122 that is received within the hole 124 of the top surface 72 of the exhaust collection cavity 68. A sensor 126 may be inserted into the column 80 for measuring temperature, gas characteristics, etc. The sensor is connected to the boom which is part of the electrical system 18.

With reference to FIGS. 2, 3 and 6, the electrical system 18 includes a boom 128 that is pivotally connected by pin 129 to the frame 28. The boom 128 can be selectively positioned and held upright by a lock 130 or pin that extends through member 132 and boom 128. A plurality of connectors 132 and associated harnesses are connected to the boom 128. Each harness 134 is in turn connected to various sensors 126 that are positioned throughout the engine and testing apparatus. To assist in the flexibility of the engine delivery system 10, the connectors 132 and associated harnesses can be easily replaced. The boom 128 is preferably made of channel aluminum to allow wires to be routed within the channel to pipe 136 and to electrical panel 138. The panel 138 is preferably water tight and is secured to the frame 28 and has a door 140 and a control panel for arranging the electrical components. It will be appreciated that the boom 128 could be adjustable side to side instead of the adjustable mode disclosed and further the boom could be located off to the side of the frame.

With reference to FIGS. 1 through 4, the engine mounting system 20 includes a front engine mount 142 and a rear engine mount 144. The front engine mount 142 includes a bell housing 146 that covers a simulated fly wheel that has a female spline 147 with capabilities of receiving a male spline for engine starting and testing purposes. The mount 142 also includes a bearing assembly 148 if required. The bell housing 146 is preferably made of machined steel and includes a retaining flange 150 with holes 152. A cradle 154 has a channel 156 that is configured to receive the retaining flange 150 and pins 158 lock the bell housing 146 to the cradle 154 as shown in FIG. 2. The cradle 154 sits on top of a shock mount 160 which is in turn secured to a base plate 24. The pins 158 are connected to the shock mount 160 so that they do not get lost. The shock mount 160 dampens the vibration during extended runs of the engine being tested.

Each rear engine mount 144 includes a support column 162 that is affixed to the base 24 and an upwardly extending member 164 fixed to the column 162. A pin 166 secures flange 168 of the engine to the column 162.

Handles 170 are located on the frame 28 and on the bell housing 146 and allow the operator to move the engine delivery system 10 to the preferred location.

It should be appreciated by those skilled in the art that other variations to the preferred embodiments to the present invention, beyond those mentioned above, are possible. Accordingly, it is to be understood that the protection sought and to be afforded hereby should be deemed to extend to the subject matter defined by the claims below, including all fair equivalents thereof.

What is claimed is:

1. A device for testing an engine comprising:
   a base with wheels that is operable to support an engine;
   an engine cooling system integral with the base for being removably connected to the engine for handling coolant to and from the engine;
   an exhaust manifold integral with the base, the manifold having at least one adjustable connector that is removably connected to the engine for handling exhaust from the engine; and
   an overhead member connected to the base, the member being moveable in order to facilitate loading an engine on the base;
   wherein said engine cooling system end said exhaust manifold are operable during the testing of the engine.

2. The device as claimed in claim 1, wherein the exhaust manifold includes a sealed channel that receives gasses from a pair of adjustable connectors, each said connector being spring biased.

3. The device as claimed in claim 1, wherein the adjustable connector includes:
   a column with a base that is secured to an exhaust collection cavity,
   a sleeve slideable within the column,
   a clamping system for holding the sleeve at a predetermined position, and
   a spring for biasing the sleeve.

4. The device as claimed in claim 1, wherein the overhead member is a boom that is operable to pivot between positions.

5. The device as claimed in claim 1, wherein the engine cooling system includes a coolant control member.

6. The device as claimed in claim 1, further comprising an engine cradle secured to the base for supporting an engine.

7. The device as claimed in claim 1, further comprising a cradle connected to the base, the cradle having a locking member.

8. The device as claimed in claim 1, further comprising a flywheel housing secured to the engine, the housing removably connected to the base.

9. The device as claimed in claim 1, further comprising an electrical panel secured to an upright member extending from the base.

10. An engine testing device comprising:
    a transportable vehicle having a platform for supporting an engine;
    an engine cooling system removably connected to the engine for handling coolant to and from the engine with fluid channels that are connected to the platform;
    an exhaust recovery system secured to the platform and removably connected to the engine for handling exhaust from the engine with a pair of adjustable exhaust connectors extending upright;

an engine cradle supported on the platform for being removably connected to the engine; and an overhead boom pivotably connected to a vertical member, the vertical member being connected to the platform;

wherein said engine cooling system and said exhaust recovery system are operable during the testing of the engine.

11. The testing device as claimed in claim 10, wherein the exhaust recovery system includes a chamber that is in communication with the pair of adjustable exhaust connectors, the adjustable exhaust connectors being operable to collect exhaust from the engine.

12. The testing device as claimed in claim 10, wherein the engine cooling system fluid channels have split chambers.

13. The testing device as claimed in claim 10, wherein the engine cradle includes a front engine support positioned on the platform and a rear engine support positioned on the platform.

14. The testing device as claimed in claim 10, wherein the overhead boom includes an elongated member with electrical connectors secured thereto.

15. The testing device as claimed in claim 10, wherein the exhaust recovery system includes spring biased telescoping adjustable exhaust connectors for engaging an exhaust manifold.

16. The testing device as claimed in claim 10, wherein the exhaust recovery system includes selectively positionable adjustable exhaust connectors.

17. The testing device as claimed in claim 10, wherein fluid channels of the engine cooling system are connected to an upright column with inlet and outlet pipes extending from the fluid channels.

18. A device for testing an engine, the device comprising:

a portable pallet for supporting an engine, said portable pallet having a frame member;

an exhaust manifold system connected to the portable pallet, the exhaust manifold system including an adjustable exhaust connector removably connected to the engine for handling exhaust from the engine, an exhaust collection cavity connected to the exhaust connector and a sensing device connected to the adjustable exhaust connector; and a boom extending over the engine and secured to the frame member, a plurality of sensors and connectors removably connected to the boom;

wherein said exhaust manifold system is operable during the testing of the engine.

19. The device for testing an engine as claimed in claim 18, further comprising a means for cooling an engine during a testing cycle.

20. The device for testing an engine as claimed in claim 18, further comprising a means for supporting an engine on the pallet.

* * * * *